(12) United States Patent
Ferrier et al.

(10) Patent No.: US 11,199,108 B2
(45) Date of Patent: Dec. 14, 2021

(54) OUTLET OF A HOT-GAS PIPE OF AN AIRCRAFT ENGINE PASSING THROUGH AN ENGINE WALL

(71) Applicant: SAFRAN AIRCRAFT ENGINES, Paris (FR)

(72) Inventors: Romain Jean-Claude Ferrier, Moissy-Cramayel (FR); Sébastien Christophe Chalaud, Moissy-Cramayel (FR); Philippe Gérard Chanez, Moissy-Cramayel (FR); Lauren Davis, Moissy-Cramayel (FR); Bastien Pierre Verdier, Moissy-Cramayel (FR); Christian Sylvain Vessot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/058,433

(22) PCT Filed: May 24, 2019

(86) PCT No.: PCT/FR2019/051199
§ 371 (c)(1),
(2) Date: Nov. 24, 2020

(87) PCT Pub. No.: WO2019/229337
PCT Pub. Date: Dec. 5, 2019

(65) Prior Publication Data
US 2021/0207494 A1  Jul. 8, 2021

(30) Foreign Application Priority Data
May 30, 2018  (FR) ..................... 18 54624

(51) Int. Cl.
*F01D 25/12* (2006.01)
*B64D 33/04* (2006.01)
*B64D 33/08* (2006.01)

(52) U.S. Cl.
CPC .............. *F01D 25/12* (2013.01); *B64D 33/04* (2013.01); *B64D 33/08* (2013.01); *F05D 2220/323* (2013.01)

(58) Field of Classification Search
CPC ... F01D 25/12; F05D 2220/323; B64D 33/04; B64D 15/04; B64D 33/08; B64D 33/10; F02C 7/047
See application file for complete search history.

(56) References Cited

U.S. PATENT DOCUMENTS

| | | | |
|---|---|---|---|
| 2001/0003897 A1* | 6/2001 | Porte | F02C 7/047 |
| | | | 60/39.093 |
| 2007/0289309 A1 | 12/2007 | Zysman | |
| 2017/0233091 A1 | 8/2017 | Iarocci et al. | |

FOREIGN PATENT DOCUMENTS

| | | |
|---|---|---|
| EP | 0 536 089 A1 | 4/1993 |
| FR | 3 015 569 A1 | 6/2015 |

OTHER PUBLICATIONS

International Search Report dated Sep. 12, 2019 in PCT/FR2019/051199 filed on May 29, 2019, 3 pages.

(Continued)

*Primary Examiner* — Jacob M Amick
(74) *Attorney, Agent, or Firm* — Oblon, McClelland, Maier & Neustadt, L.L.P.

(57) ABSTRACT

The outlet of a heat exchange circuit extending under a wall, such as a nacelle cowling of an aircraft engine, is divided into openings in the form of parallel slots which are elongated in the longitudinal direction and successively arranged in the transverse direction to divide the hot gas into streams while facilitating the circulation of fresh gas streams, origi- (Continued)

Figure 1:
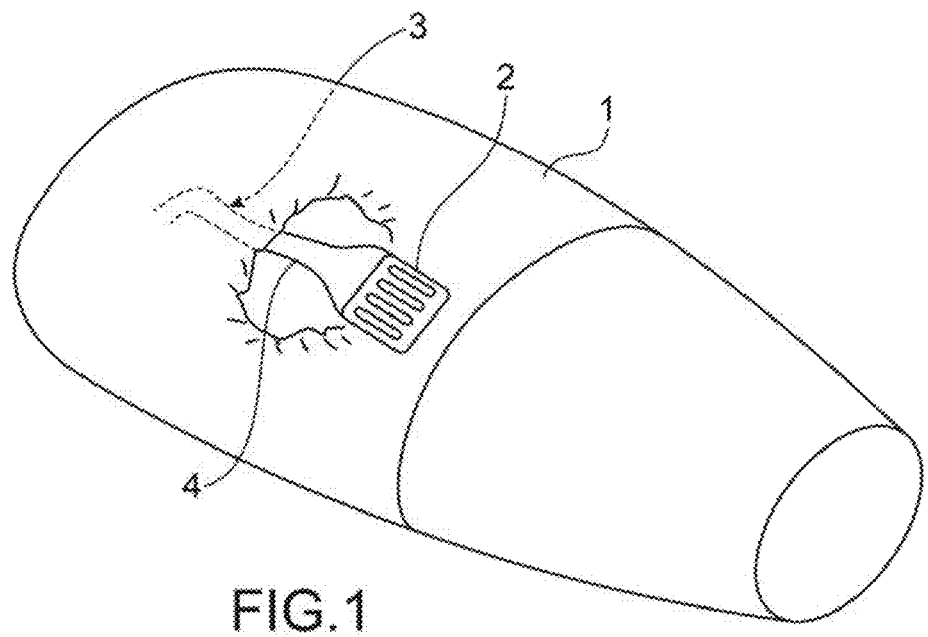

nating from an external flow, on the intermediate laminates. The hot gas cannot fall back easily onto the outer face of the wall and risk damaging the wall, and the gas mixes more effectively with the fresh outdoor air. The openings are provided with nozzles flaring in the transverse direction and the downstream longitudinal direction to facilitate the mixing of the hot and cold gas streams.

7 Claims, 4 Drawing Sheets

(56) References Cited

OTHER PUBLICATIONS

French Search Report (with Translation of Categories) dated Jan. 24, 2019 in French Application No. 1854624 filed on May 30, 2018, 2 pages.

* cited by examiner

OUTLET OF A HOT-GAS PIPE OF AN AIRCRAFT ENGINE PASSING THROUGH AN ENGINE WALL

The present invention relates to an outlet of a hot-gas pipe of an aircraft engine passing through a wall of the engine.

Aircraft engine hot-gas pipes, for which the invention can be used, belong to heat exchange circuits drawing cool gas (generally air) from a relatively cool region of the aircraft, like the secondary flow path when it exists or the compressors of the main flow path, before being subjected to heating in a heat exchanger with a hotter portion of the engine that should be cooled, and which can also be a fluid (lubricating oil or gas for example). The hot gas is then released into an external environment through an opening passing through a wall of the aircraft, such as an outer nacelle cowl or an outer or inner stator casing.

It happens that the hot gas is rejected at a temperature higher than that which can be tolerated without damage by the material of the wall, that the hot gas washes before being dispersed and which therefore undergoes degradation around the outlet through which the gas pipe ends up passing.

Examples of such an outlet, possibly subject to this difficulty, can be found in documents FR 3 015 569-A, US 2007/0289309-A1, US 2001/0003897-A1, US 2017/0233091-A1 and EP 0536089-A1.

The invention was designed in order to obviate this risk of damage, and it is based on the idea of imposing an early detachment of the hot gas, in order to keep it away from the wall near the outlet. The flow of a cooler gas that normally circulates on the outer face of the wall during engine operation is exploited by maintaining a protective cool gas layer. The hot gas undergoes rapid mixing with the cool gas without being able to stay on the wall, and then becomes harmless.

A general definition of the invention is an outlet of a hot-gas pipe for an aircraft engine, the pipe extending under a face called inner face of an engine wall, opposite to a face called outer face of the wall, the pipe connecting to the outlet, the outlet consisting of a plurality of oblong and distinct openings passing through the wall, having a direction of main elongation (X) substantially coinciding with a direction of a flow of cool gas over the outer face during ordinary engine operation, the openings succeeding each other in a transverse direction (T) of the wall which is perpendicular to the direction of main elongation (X); the openings are provided with slats flaring in the transverse direction, and extending beyond one end of the openings in said downstream direction.

In the following description, the face in front of which the hot gas is ejected is conventionally called outer face of the wall, and the opposite face of the wall, in front of which the hot-gas pipe extends is the inner face. In most situations, the outer face will correspond to a radially outer face of the engine, and the surrounding cool gas may be the outside atmosphere. However, it is also possible that the outer face corresponds to the inner face of the secondary flow path of a bypass engine, and the cool gas will then be the secondary flow circulating in this flow path. In addition, the direction of main elongation often coincides with the longitudinal or axial direction of the engine, and the transverse direction to its angular direction. However, this current situation is not necessary for the proper application of the invention. The operation called ordinary operation of the engine corresponds to that which propels the aircraft.

By separating the outlet into several openings, streams of cool gas are allowed to flow tangent to the outer face of the wall between the ejected streams of hot gas, therefore while maintaining a partial flow of the cool gas in front of the outlet, which reduces or prevents the hot gas from returning against the outer face of the wall, and therefore the heating of the latter. And the slats promote the dispersion of the hot gas streams immediately downstream of the opening, and their rapid mixing with the intermediate cool gas streams. The protection of the wall against heating is reinforced.

These effects are accentuated if, according to a possible improvement, the openings are surrounded and delimited by low walls established on the outer face (in the radial direction) of the wall and rising above the outer face: the hot gas is ejected at a distance from the outer face, which allows the cool gas to maintain a protective layer of sufficient thickness. The slats are then placed at the free edges of the low walls.

According to some possible improvements, the low walls may have upper edges inclined in the direction of the main elongation; and the low walls may flare in the transverse direction towards the upper edge.

It is true that the protrusion due to the low walls increases the drag of the flow on the wall. This disadvantage can be reduced by shaping the outer face of the wall in depression curved around the openings, so that the low walls are completely or partially sunk below the general portion of the outer face.

According to another type of improvement, they can have different heights above the outer face for each of the openings.

Based on other features which may also improve the basic design, the openings may gradually taper along the longitudinal direction in the direction of flow, and the low walls may flare in the transverse direction along the radial direction.

It can be recommended that the openings be separated by distances greater than their widths in the transverse direction.

Finally, a greater regularity of the flow is obtained if the pipe is divided into distinct branches respectively connected to the openings before reaching the outlet.

Figure 2:
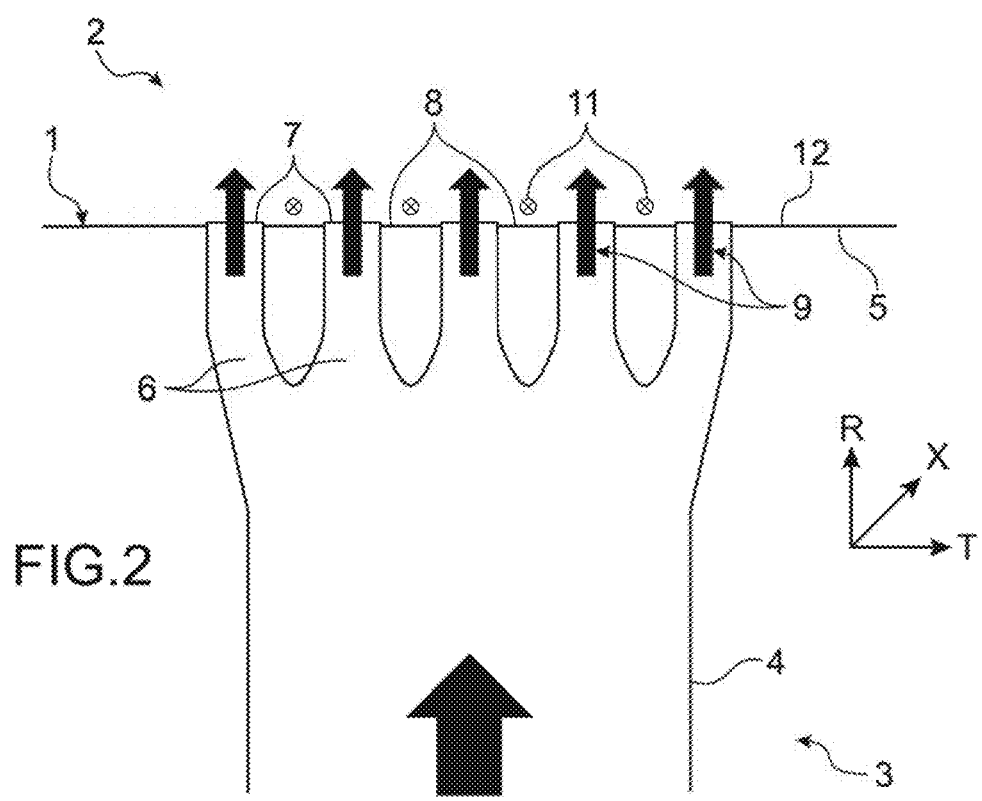
Figure 3:
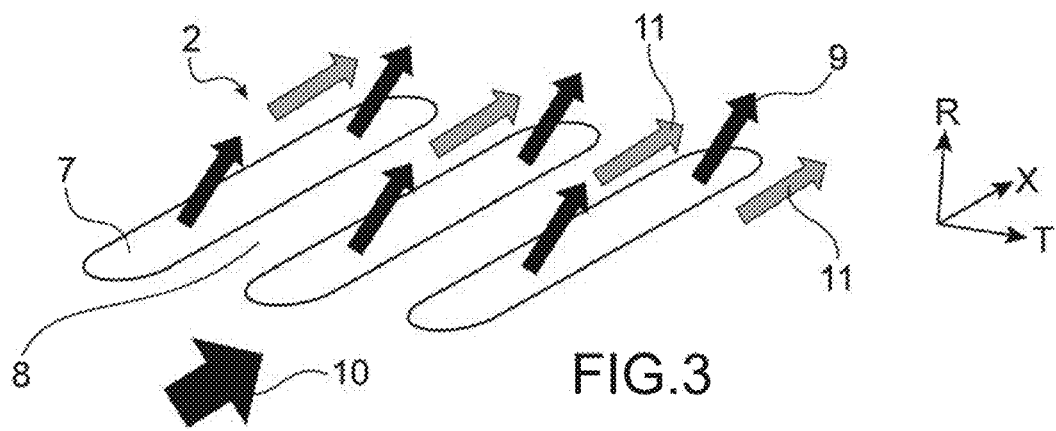
Figure 4:
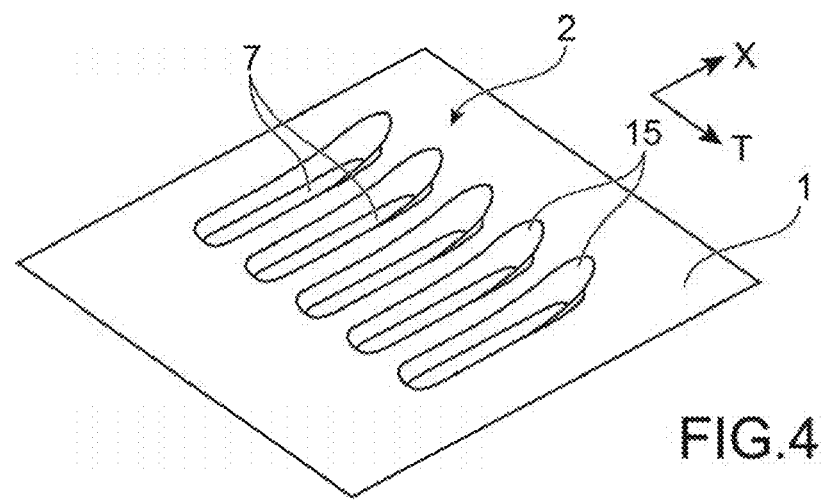

The various aspects, features and advantages of the invention will now be described in more detail by means of the following figures, which illustrate some possible embodiments thereof, not exclusive of others:

FIG. 1 is a diagram of the surroundings of the invention;
FIG. 2 illustrates the end of the heat exchange pipe;
FIG. 3 shows more particularly the outlet;
FIG. 4 precisely illustrates the characteristic slats of the invention; and FIGS. 5, 6, 7, 8, 9, 10 and 11, some variant embodiments of the invention.

FIG. 1 schematically shows a nacelle cowl surrounding an aircraft engine, the wall 1 of which is provided with an outlet 2 through which a heat exchange circuit 3 located under the wall 1 opens outside said wall, and ejects a gas jet previously withdrawn from another part of the engine and having participated in a heat exchange. It is recalled that the invention is not limited to a use on a nacelle cowl, but that it can also relate to other cowls, such as those of external or internal stator casings. Likewise, the heat exchange circuit 3 can originate from various places in the engine, its path is also not imposed and the heat exchange allows to cool another fluid which is also indifferent.

Reference is made to FIG. 2. The heat exchange circuit 3 includes at its downstream end a pipe 4 which extends under an inner face 5 of the wall 1. Approaching the latter, the pipe 4 is divided into branches 6, here distinct from each other, then parallel and with a section first decreasing, then uniform, before reaching the wall 1 and the outlet 2, and the branches 6 are connected to the outlet 2, and communicate to the outside through many openings 7 of the outlet 2, which pass through the wall 1. Their disposition is better visible in FIG. 3. The openings 7 are parallel to each other, follow one another in a transverse direction T (often the angular direction of the engine), and their shape is oblong, their largest dimension being in a longitudinal direction or a direction of main elongation X, perpendicular to the previous one on the wall 1 (often the axial direction of the engine). The length of the openings 7 and therefore of the outlet 2 in the direction X can be comprised between 100 mm and 450 mm; the width of the openings 7 in the direction T may be comprised between 5 mm and 30 mm; that of the outlet 2 between 250 mm and 600 mm; and the total area of the outlet 2 can vary between approximately 0.01 $m^2$ and 0.25 $m^2$. However, there is no real dimensional limit to the application of the invention. And the openings 7 are separated by lamellae 8 of the wall 1, the width of which may be comprised between 0.5 times and 3 times the width of the openings 7, preferably 1.0 times.

The hot gas, often air, which is ejected by the circuit 3 is therefore divided into hot streams 9 which respectively take the branches 6. Their direction may first be in the direction of height R (perpendicular to the two previous ones X and L, and often coinciding with the radial direction of the engine) by rising below the outer face 12, opposite the inner face 5, of the wall 1, before being inflected and taking a movement component in the longitudinal direction X under the effect of an external flow 10 tangent to the wall 1 (often directed downstream of the engine) of a cool gas (often ambient air). But the flow 10 is divided into cool streams 11, passing around the openings 7 and over the lamellae 8, passing over the outlet 2, with a significant flow rate which remains tangent to the wall 1. This flow rate of cool gas thwarts the return of the hot streams 9 on the outer face 12 of the wall 1 and protects it from overheating. In addition, dividing the hot and cool flows into intertwined streams 9 and 11 promotes their faster mixing and therefore the elimination of hot areas outside the outlet 2.

A feature of the invention is shown in FIG. 4 and illustrates a slat 15 on the downstream side or trailing side of the flow 10, at each of the openings 7. This is a protruding relief in the direction of height R like the previous low walls, also protruding downstream and flaring in both directions of the transverse direction T. These slats 15 partially channel the hot streams 9 at the exit of the openings 7, promoting their distancing from the wall 1, their spread in the transverse direction T and their mixture with the cool streams 11. They can be established directly on the outer face 12 of the wall 1, or on the low walls 13 or 14.

This design can be supplemented in various ways with the hope of perfecting it.

Figure 5:
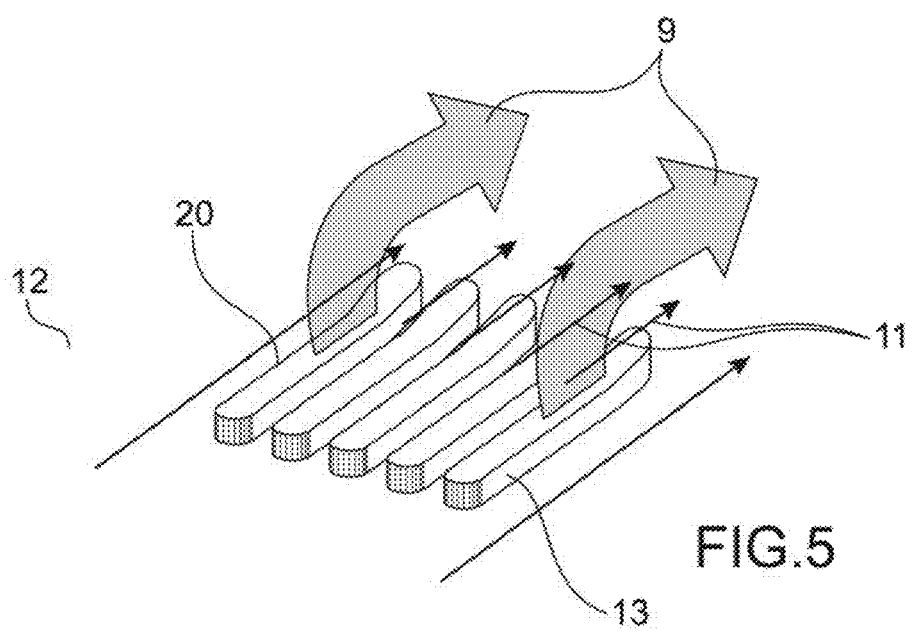
Figure 6:
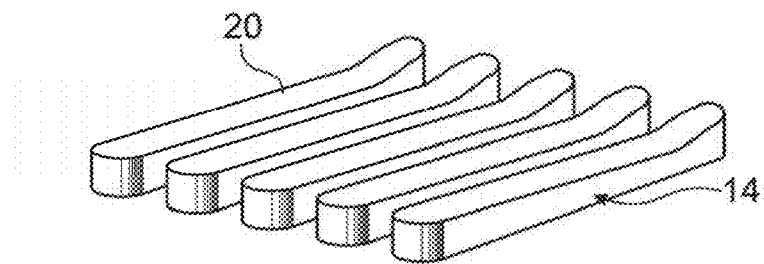

FIG. 5 shows a possible arrangement, wherein the openings 7 do not extend at the outer face 12 but a little above them, the branches 6 of the circuit being extended by low walls 13 protruding on the outer face 12 and which surround the openings 7. Their height may be comprised between 5 mm and 30 mm. With such a disposition, the hot streams 9 exit the heat exchange circuit 3 at a distance from the wall 1 through an upper edge 20 of the low walls 13, which promotes maintaining the cool air streams 11 between the openings 7.

In the representation of FIG. 5, the low walls 13 are of constant height. This disposition is not necessary and low walls 14 (FIG. 6) can be considered, whose height is variable in the direction of the main elongation of the openings 7 (the longitudinal direction X) and therefore of the upper edges 20 inclined in this direction. If this height decreases in the downstream direction of the flow 10, the evacuation of the hot gas can be facilitated, however allowing a smaller distance between the hot streams 9 and the outer face 12; if, on the contrary, the height of the low wall is increasing in the downstream direction, the ejection is more difficult, but the hot streams 9, on the contrary, remain farther from the wall 1, which can also be advantageous. The slats 15, characteristic of the invention, are placed on the upper edge 20 of the low walls 13 or 14, when the latter are present. They are still present, although not shown, in the embodiments of the following figures.

Figure 7:
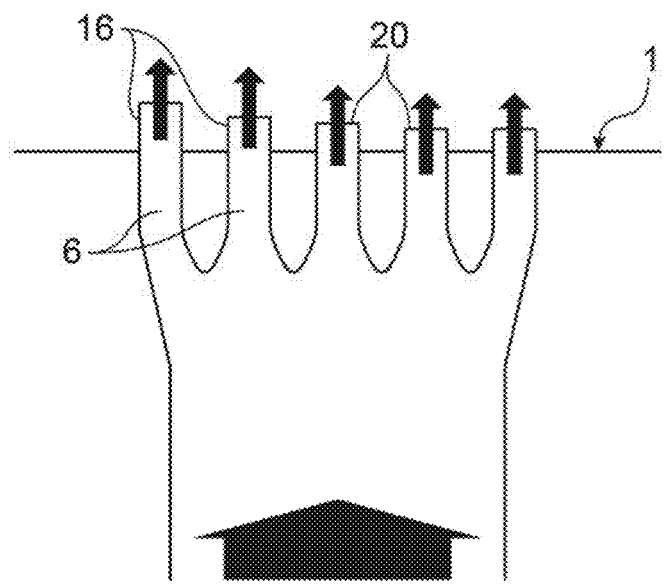
Figure 8:
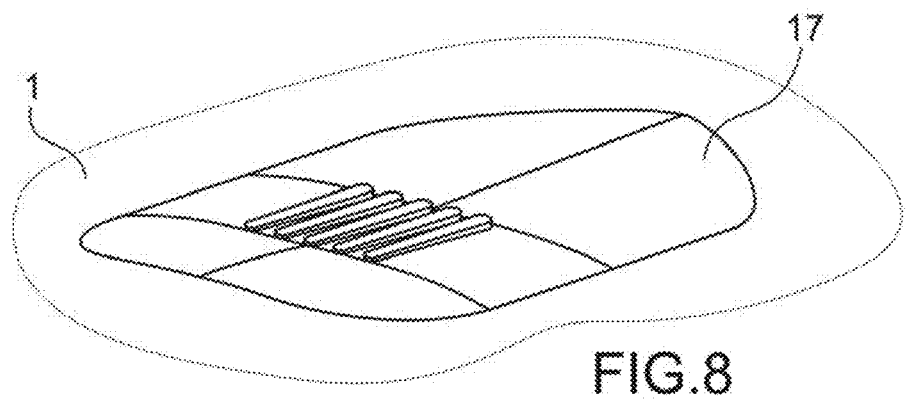
Figure 9:
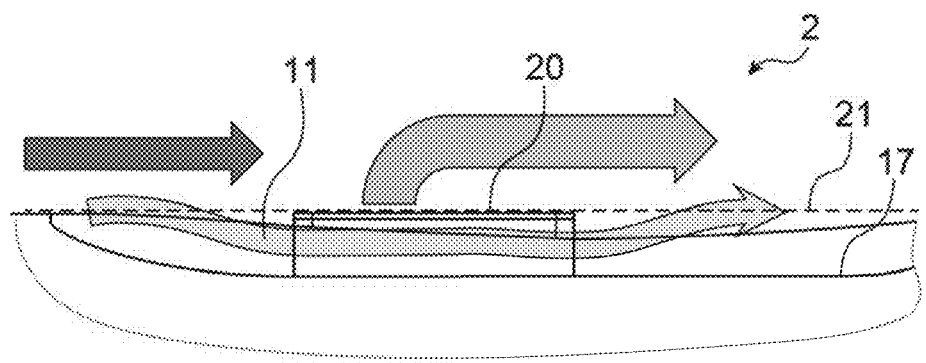

A slightly different design is shown in FIG. 7: the low walls, then referenced by 16, have heights which are different from each other, which can be considered for heat exchange circuits 3 where the heating of the gas is heterogeneous, the highest low walls 16 then being placed at the end of the branches 6 through which pass the hottest streams 9, that should be moved further away from the wall 1. There is no binding rule for the distribution of the heights of the low walls 16.

One disadvantage of these outer low walls is that they create additional drag. It is possible to reduce it by disposing the outlet 2 in a depression or pocket 17 of the wall 1 (FIGS. 8 and 9) so that the edge 20 of the low walls does not protrude, or is less protruding, from the main part 21 of the wall 1 around the pocket 17. The external pressure inflects the cool streams 11 in the pocket 17 and therefore maintains the features and effects of the other embodiments. This disposition is advantageous for the low walls considered so far, or the outer relief structures of any kind. The slats 15 can also extend under the main part 21.

The previous low walls had a longitudinal section of regular shape. This condition is not necessary either, and it is possible to consider low walls 22 (FIG. 11) flaring in the transverse direction T towards the upper edge 20, which further facilitates forming the cool streams 11 and maintaining them on the wall 1.

Figure 10:
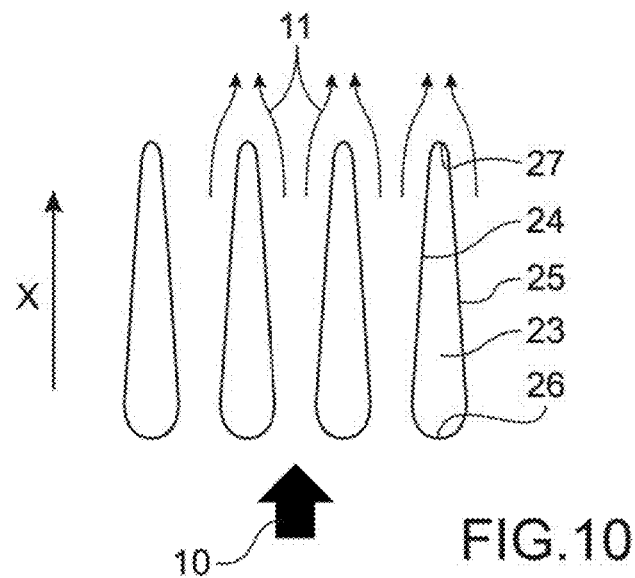
Figure 11:
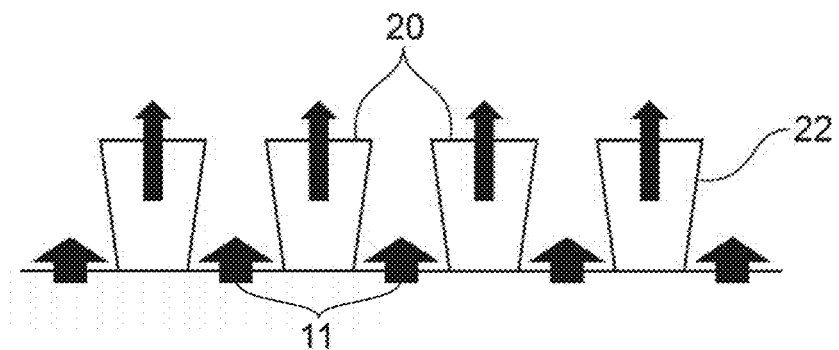

An alternative embodiment, shown in FIG. 10, consists in providing the openings, now referenced by 23, with sections tapering downstream of the flow 10; this disposition allows to limit the impact of the low walls on the cool air flow 11 and to promote the reformation of the cool air layer downstream of the outlet.

The invention can be implemented in many other different ways. The openings 7 and 23 shown so far were delimited by lateral sides 24 and 25 (referenced in FIG. 11), parallel or oblique to the longitudinal direction X, rectilinear, and, at the ends, by a leading edge 26 and a trailing edge 27 upstream and downstream connecting the two lateral sides 24 and 25, both rounded; however, these features are not essential either. The shapes and sections of the openings 7 and 23 could also be different from each other.

The invention claimed is:

1. An outlet of a hot-gas pipe of an aircraft engine, the pipe extending under a face called an inner face of an engine wall, opposite to a face called an outer face of the engine wall, the pipe connecting to the outlet, the outlet defining a plurality of oblong and distinct openings passing through the engine wall, having a direction of main elongation substantially coinciding with a direction of a flow of cool gas over the outer face during ordinary engine operation, the openings succeeding each other in a transverse direction of the engine wall which is perpendicular to the direction of main elongation, wherein the openings are provided with slats flaring in the transverse direction, and extending beyond one end of the openings in said downstream direction.

2. The outlet according to claim 1, wherein the openings are surrounded and delimited by low walls established on the outer face of the engine wall and rising above the outer face in a radial direction, the slats being placed on an upper edge of the low walls.

3. The outlet according to claim 2, wherein the low walls have different heights above the outer face for each of the openings.

4. The outlet according to claim 1, wherein the outer face of the engine wall is in depression curved around the openings.

5. The outlet according to claim 1, wherein the openings gradually taper along the longitudinal direction.

6. The outlet according to claim 1, wherein the openings are separated by distances greater than their widths in the transverse direction.

7. The outlet according to claim 1, wherein the pipe is divided into distinct branches respectively connected to the openings before reaching the outlet.

\* \* \* \* \*

UNITED STATES PATENT AND TRADEMARK OFFICE
CERTIFICATE OF CORRECTION

| | |
|---|---|
| PATENT NO. | : 11,199,108 B2 |
| APPLICATION NO. | : 17/058433 |
| DATED | : December 14, 2021 |
| INVENTOR(S) | : Romain Jean-Claude Ferrier et al. |

It is certified that error appears in the above-identified patent and that said Letters Patent is hereby corrected as shown below:

On the Title Page

Column 2, Item (56), under "OTHER PUBLICATIONS", Line 2, delete "29," and insert -- 24, --, therefor.

Signed and Sealed this
Seventeenth Day of May, 2022

*Katherine Kelly Vidal*

Katherine Kelly Vidal
*Director of the United States Patent and Trademark Office*